No. 613,051. Patented Oct. 25, 1898.
G. W. BABCOCK.
SULKY OR RIDING ATTACHMENT FOR AGRICULTURAL IMPLEMENTS.
(Application filed June 30, 1897.)
(No Model.) 3 Sheets—Sheet 1.
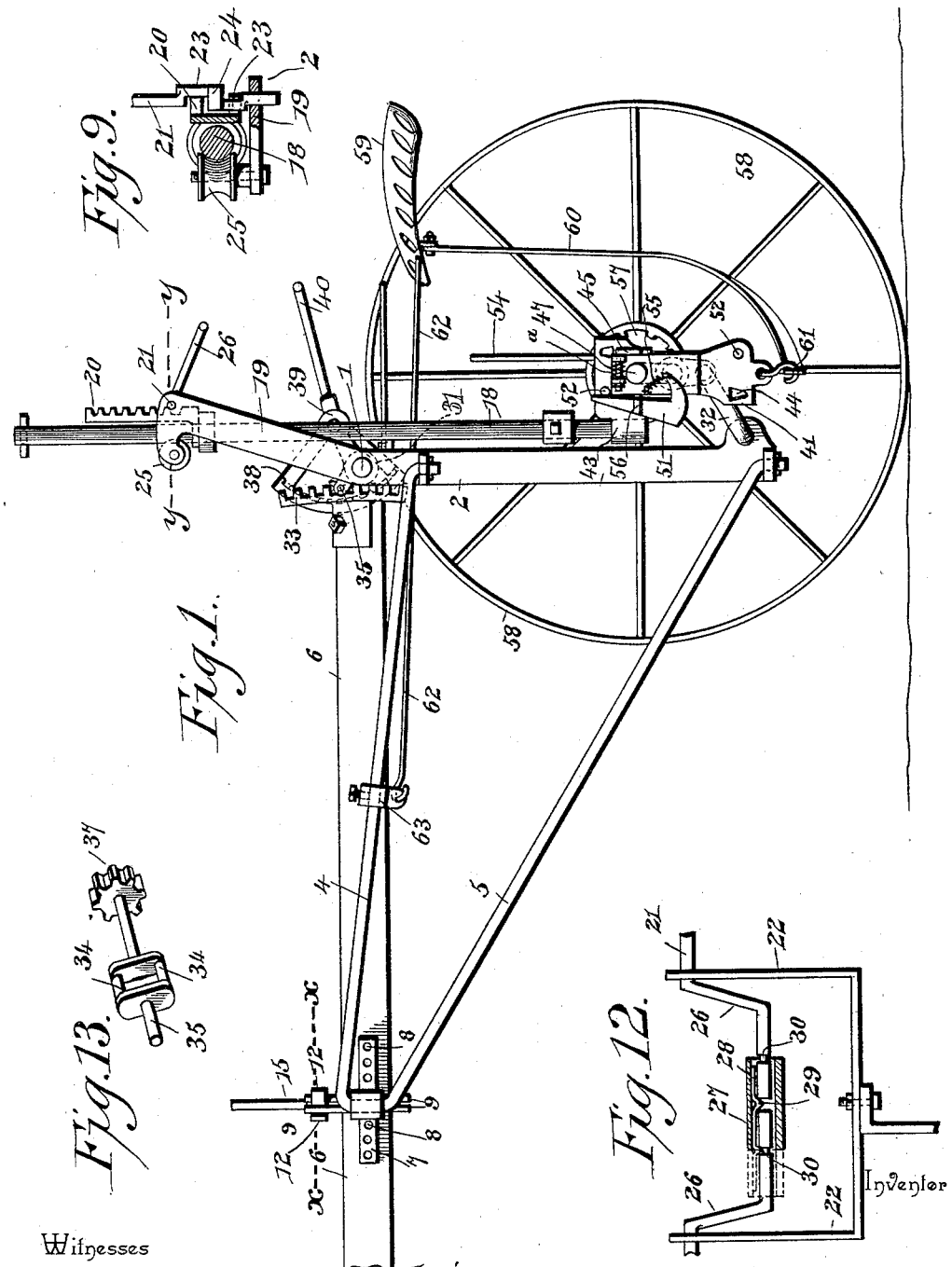
Witnesses
Jas. H. M°Cathran
V. B. Hillyard.
Inventor
George W. Babcock.
By his Attorneys,
C. A. Snow & Co.

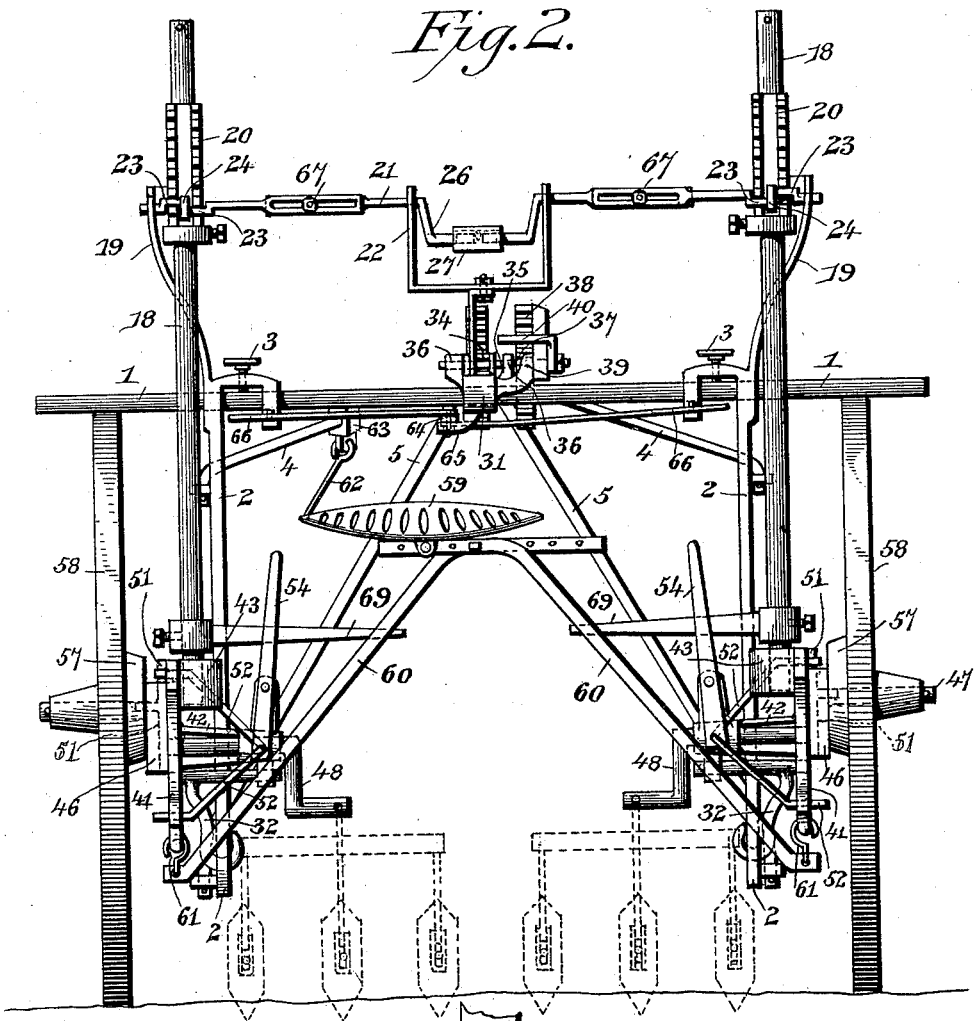

No. 613,051. Patented Oct. 25, 1898.
G. W. BABCOCK.
SULKY OR RIDING ATTACHMENT FOR AGRICULTURAL IMPLEMENTS.
(Application filed June 30, 1897.)
(No Model.) 3 Sheets—Sheet 3.
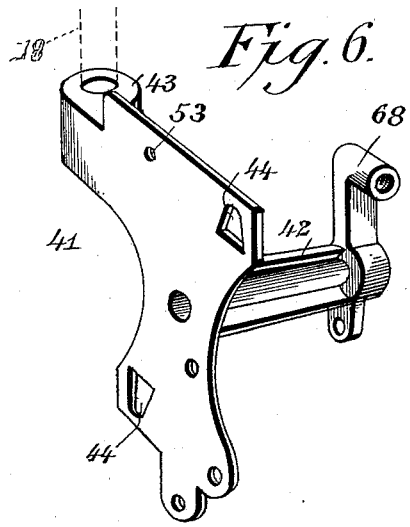
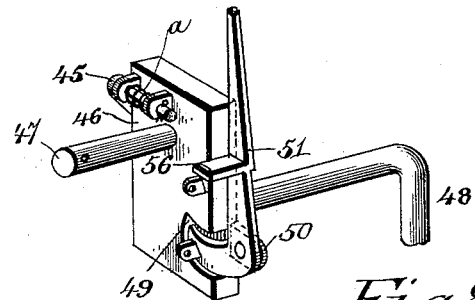
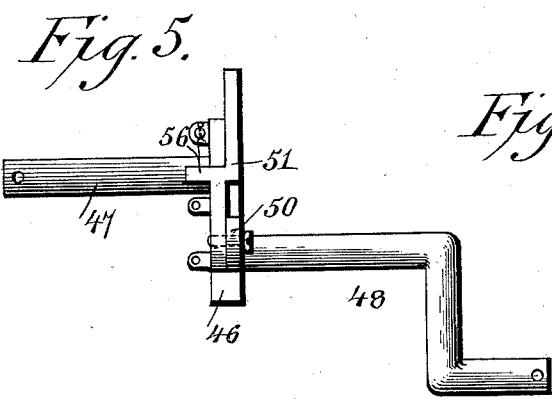
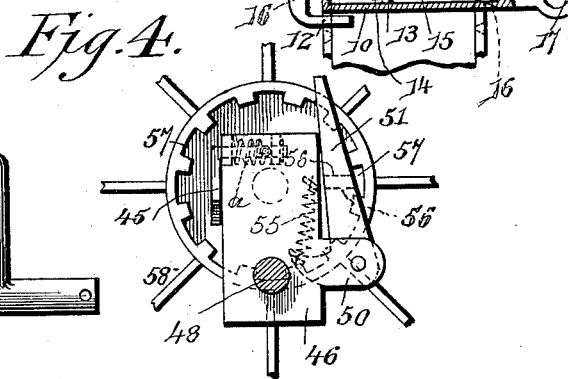
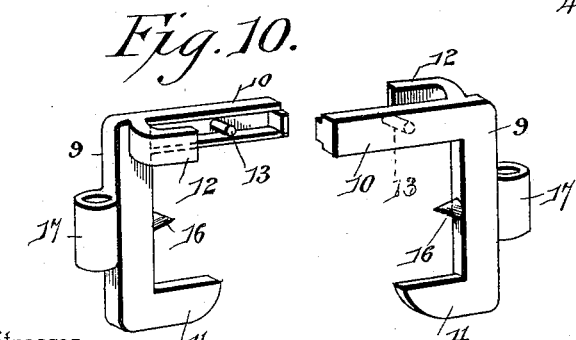
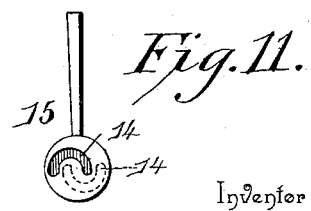
Witnesses
Inventor
George W. Babcock.
By his Attorneys,

UNITED STATES PATENT OFFICE.

GEORGE W. BABCOCK, OF BROCKPORT, NEW YORK.

SULKY OR RIDING ATTACHMENT FOR AGRICULTURAL IMPLEMENTS.

SPECIFICATION forming part of Letters Patent No. 613,051, dated October 25, 1898.

Application filed June 30, 1897. Serial No. 642,931. (No model.)

*To all whom it may concern:*

Be it known that I, GEORGE W. BABCOCK, a citizen of the United States, residing at Brockport, in the county of Monroe and State of New York, have invented a new and useful Sulky or Riding Attachment for Agricultural Implements, of which the following is a specification.

This invention relates to a carriage or riding attachment for agricultural implements of various kinds whereby the driver may be seated and drawn over the field with the implement in operation for tilling the soil.

One of the principal objects of the invention is to combine with the carriage means easy of operation for raising and lowering the earth-treating devices and body of the carriage on one side or both, as required, and for tilting the frame or body of the attachment, whereby the pitch of the earth-working means can be regulated to cause them to penetrate the soil to a greater or less depth at front or rear. The raising and lowering devices are of such nature as to be operated automatically by the traction of the sulky or carriage or by hand.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a side elevation of a sulky or riding attachment for farm implements constructed in accordance with this invention and embodying the essential features thereof, the near wheel being removed. Fig. 2 is a rear view thereof. Fig. 3 is a detail view, in plan elevation, of the transverse beam, the standards having lateral adjustable connection therewith, the means for moving the said standards laterally, and the mechanism for vertically adjusting the rear end of the pole or tongue. Fig. 4 is a view in elevation of the crank-axle, the toothed rim applied to or formed with the ground-wheel, and the pawl for connecting the two. Fig. 5 is a rear view of the crank-axle. Fig. 6 is a detail view of the hanger which supports the crank-axle. Fig. 7 is a detail view in perspective of the crank-axle and pawls attached thereto. Fig. 8 is a sectional detail on the line X X of Fig. 1. Fig. 9 is a detail section on the line Y Y of Fig. 1. Fig. 10 is a detail view of the clamp for adjustably connecting the draft-rods with the pole or tongue, the parts comprising the clamp being separated. Fig. 11 is a detail view of the cam-lever for operating the movable parts of the clamp. Fig. 12 is a detail view showing the means for connecting the shafts by means of which the vertically-adjustable frame is moved. Fig. 13 is a detail view of the shaft for operating the pole or tongue to move its rear end vertically.

Corresponding and like parts are referred to in the following description and indicated in the several views of the accompanying drawings by the same reference characters.

The frame or body of the sulky is of arched form and comprises a transverse beam 1 and pendent standards 2, laterally adjustable on the beam 1 and secured in place by binding-screws 3, passing through the upper part of the standards and engaging with the beam 1. By this means the sulky or riding attachment can be expanded or contracted in width, as required. Draft-rods 4 and 5 connect at their rear ends with the upper and lower portions of the standards 2 and have pivotal and adjustable connection at their front ends with the pole or tongue 6, whereby the said pole may be tilted relatively to the frame for varying the pitch of the earth-working devices. A plate 7 is secured to each side of the pole or tongue 6 a short distance from its rear end and has a series of openings 8. Similarly-formed irons are placed upon opposite sides of the pole or tongue, and each consists of a vertical part 9 and horizontal members 10 and 11, the parts 11 extending beneath the pole or tongue 6 and the parts 10 overlapping and projecting over the top side of the pole and having lateral extensions 12, by means of which the overlapping parts 10 are guided in their movements and prevented from lateral displacement. Pins 13 extend inwardly from the opposing sides of the overlapping parts 10 and enter cam-grooves 14 formed in the head of a lever 15, whereby the castings are separated and brought together to enable the parts 4 and 5 to be shifted along the pole or tongue. Conical studs 16 extend inwardly from the parts 9 and are adapted to enter corresponding openings 8 and form pivots for the pole 6 to turn upon when adjusted vertically at its rear end. Sleeves 17 are provided at the outer side of the parts 9 and receive the bent portion of the rod or bar forming the draft-rods 4 and 5, as clearly indicated.

The sulky-frame, comprising the beam 1, standards 2, having vertical extensions 19, and the draft-rods 4 and 5, has adjustable connection with the standards 18 and is movable vertically by means of the instrumentalities now to be described. A double rack 20 is secured to the upper portion of each standard, and a shaft 21 is journaled at its outer end in an extension 19 and at its inner end in an arm 22. This shaft 21 is formed near its outer end with oppositely-disposed crank portions 23, arranged to coöperate with the double rack 20 for moving the sulky-frame up or down. A circular portion 24 separates the crank portions 23 and operates in the space formed between the toothed portions forming the double rack and guides the latter in its vertical movements. A roller 25 is located in advance of each standard 18, and the latter is acted upon as the sulky-frame moves vertically. The inner ends of the shafts 21 have cranks 26, whereby the sulky-frame can be moved at one or both sides. A sleeve 27 is placed upon one of the cranks and may be shifted to connect the cranks, so that both may be operated simultaneously, whereby both sides of the sulky-frame are adapted to be moved up or down. The sleeve 27 has a spring 28 secured on its inner side and formed with a projecting part 29 to enter the space formed between the cranks 26, whereby the sleeve is held at an intermediate point, and when out of action said part 29 enters an annular groove 30 of either of the cranks, whereby the sleeve is retained in place. The arms 22 are secured to an arm of a cuff or sleeve 31, located midway of the beam 1. The lower ends of the standards 18 are connected with the lower terminals of the pendants 2 by links 32, which have pivotal connection with each, so as to admit of the sulky-frame moving vertically. The frame tilts when moving the rear end of the pole 6 vertically to secure any required pitch of the earth-working devices.

A rack 33 is secured to the rear end of the pole or tongue, and its teeth intermesh with oppositely-disposed pins or cranks 34 of a shaft 35, journaled in lugs 36, projecting from the sleeve 31. One end of the shaft 35 is provided with a pinion 37, engaged by an internally-toothed segment 38, fulcrumed to an arm 39 of the sleeve 31, said segment having a handle 40, by means of which it is rocked upon its pivotal support to rotate the shaft 35, whereby the rear end of the pole 6 is raised or lowered by the action of the intermeshing parts 34 and 33.

A hanger 41 is secured to the lower end of each standard 18, and consists of a plate having a bearing-sleeve 42 and a socket 43, the latter receiving the lower end of the standard 18, which is secured therein. Notches 44 are formed in the outer face of the plate at diagonally opposite points to receive a pawl 45 provided on the plate of the crank-axle, whereby the latter is held in either of its extreme positions. The crank-axle consists, essentially, of a plate 46, having a spindle 47 and a crank-arm 48 projecting from its opposite faces, the inner horizontal portion of the crank-arm 48 obtaining a bearing in the sleeve 42 of the hanger 41. The plate 46 has a notch 49 and a lug 50. A pawl 51, having one end bent, is pivoted to the lug 50, and its bent end operates in the notch 49, and this pawl is normally held out of action by means of one or the other of a pair of trips 52, which are slidingly mounted in openings 53 at diagonally opposite points of the hanger 41 and which are connected at their inner ends to an operating-lever 54. A spring 55 throws the pawl into action when released by withdrawing the trips 52, and pawl 45, with its spring $a$, jointly aided by the pawl 51 and trips 52, holds plate 46 in engagement with hanger 41 until pawl 51 is thus released by the said trips. The long arm or outer end of the pawl 51 has a lateral extension 56 to engage with an internally-toothed rim 57 formed with or applied to the inner side of a ground-wheel 58, mounted upon the spindle 47. Obviously when the extension 56 of the pawl 51 is in engagement with a cog of the toothed rim 57 the crank-axle will rotate with the ground-wheel in the forward movement of the sulky and change the relation of the parts 47 and 48, whereby the sulky-frame, with the earth-working devices, is raised or lowered by the traction of the sulky, and after the ground-wheel has made a half-revolution the pawl 51 will engage with one or the other of the trips 52, which have been projected, thereby moving the pawl inward and withdrawing its extension 56 out of engagement with the part 57, and at the same time the pawl 45 will enter one or the other of the notches 44 and secure the crank-axle and hanger in the required position. The seat 59 is secured to the upper end of diverging bars 60, which have their lower diverging ends curving forwardly and connected by shackles 61 with apertured lugs at the lower ends of the hangers 41, the upper ends of the bars 60 overlapping and having adjustable connection. A rod 62 connects the seat 59 with a sleeve 63, adjustably mounted upon the upper draft-rod 4.

The agricultural implement, whether it be a plow or cultivator, is coupled to a convenient part of the sulky-frame, preferably to the standards 2, and, when desired, to the crank-arm 48, so that the various adjustments provided for by the means herein described may be had, according to the nature of the work and the condition of the ground to be tilled.

In order to provide for the simultaneous adjustment of the standards 2, a lever 64 is fulcrumed a short distance from its inner end to an arm 65 of the sleeve 31 and has connection upon opposite sides of its fulcrum with the head portions of the standards 2 by means of links 66, which in turn have adjustable connection with the head portions of the standards 2 to provide for an extreme adjustment of the standards greater than can be secured by a single throw of the lever 64 in either direction. When it is required to shift the standards 2 laterally, the binding-screws 3 are loosened, and after the parts have been moved to the required position they are made fast by retightening the binding-screws 3. The shafts 21 are constructed so as to be capable of being lengthened and shortened to admit of the standards 18 separating or coming closer together, inasmuch as they follow the adjustments of the standards 2, and, as shown, the parts comprising the shafts 21 have their inner ends overlapping and slotted and held together by a fastening 67, passing through the slotted parts. Obviously any construction which will admit of the shafts lengthening and shortening may be adopted.

The levers 54 are fulcrumed to extensions 68 of the bearing-sleeves 42 and are located within convenient reach of the driver's seat, so as to admit of either or both crank-axles being thrown into or out of gear with the ground-wheels, as required. Arms 69 are secured to the lower ends of the standards 18 and receive the feet of the driver and enable the cultivators, plows, or other earth-working devices to be shifted laterally, as generally required in agricultural implements of this character when in operation.

The guiding of the soil-working parts is performed by swaying the main-framework arch, to which they are attached, to the right or left, as required, by employing the point of contact with the ground of the carrier-wheels as centers and the connecting parts between the axle and the vertical standards 18 as sweeps for the frame to swing on and moving said sweeps by means of the arms 69, rigidly attached to the standards 18, by placing the feet against their inner ends, which action is as follows: The pushing forward of the left arm with the left foot swings the frame to the left, at the same time obliging the right arm to swing back. Likewise the pushing forward of the right arm with the right foot swings the frame to the right, which in turn also obliges the left arm to swing back. The guiding-arms can be adjusted to a higher or lower position by their set-screws to accommodate the attachments or the operator. It will be seen that this swinging of the main framework to the left turns or cramps the wheels, which aid to move the frame in the same direction, and when the frame is moved to the right the wheels likewise help in that direction.

The ground-wheels 58 being mounted in the manner set forth have an action similar to that of ordinary caster-wheels by reason of the manner of mounting the standards 18 and will follow the motion or direction in which the framework of the machine might lead if permitted to do so, and the links 32 avoid the friction which would come upon the standards 18 if made to work in boxes at their base similar to the usual manner of casters.

Having thus described the invention, what is claimed as new is—

1. In a sulky or riding attachment for agricultural implements, the combination with a pole or tongue, and the frame, of oppositely-disposed castings embracing the sides of the pole and having inner extensions to make positive engagement with the sides of the pole and form means for the pole to tilt upon, and means for moving the castings apart or bringing them together, substantially as set forth.

2. In a sulky or riding attachment for agricultural implements, the combination with a pole or tongue, and the frame, of oppositely-disposed castings embracing the sides of the pole and having overlapping parts, and formed with inner extensions to make positive engagement with the pole, and a lever having a cam portion and adapted to coöperate with extensions of the overlapping parts of the castings for moving them apart or bringing them together, substantially as set forth.

3. In a riding attachment or sulky for agricultural implements, the combination with the pole or tongue, and the frame, of oppositely-disposed castings embracing the sides of the pole and having inner extensions to engage therewith, and provided with overlapping parts having inwardly-extending pins, and a lever operating in the space formed between the overlapping parts of the castings and having a cam-groove to receive the inwardly-extending pins, substantially as set forth for the purpose described.

4. In a sulky or riding attachment for agricultural implements, the combination with the pole or tongue, and the frame, of oppositely-disposed castings embracing the sides of the pole and having inner extensions to engage therewith, and overlapping parts formed with inwardly-extending pins and lateral extensions, the latter holding the overlapping parts together and guiding them in their movements, and a lever operating in the space formed between the overlapping parts of the castings and having a cam-groove to receive the inwardly-extending pins thereof, substantially as set forth.

5. In combination, a pole or tongue, a frame, plates secured to the sides of the pole and provided with a corresponding series of openings, oppositely-disposed castings embracing the sides of the pole and formed with outer sleeves, inner extensions, overlapping parts, and lateral extensions which hold the overlapping parts together and guide them in their movements, pins extending inwardly from the overlapping parts of the castings, and a lever working between the overlapping parts of the said castings and having a cam-groove to receive the pins thereof, substantially as set forth.

6. In a riding attachment for agricultural implements, the combination of a frame, a pole or tongue having pivotal connection with the frame, a rack secured to the inner end of the pole, a shaft having oppositely-disposed crank portions to coöperate with the rack for raising and lowering the inner end of the pole, and means for turning the shaft in its bearings, substantially as set forth.

7. In a riding attachment for agricultural implements, the combination of a frame, a pole or tongue having pivotal connection with the frame, a rack secured to the inner end of the pole, a shaft having oppositely-disposed pins intermeshing with the rack and provided with a pinion, and a toothed segment meshing with the pinion for rotating it and the shaft, whereby the inner end of the pole is raised or lowered, substantially as described.

8. In a riding attachment for agricultural implements, the combination of a vertically-adjustable frame, a standard, a double rack applied to the said standard, and a shaft having oppositely-disposed crank portions to coöperate with the independent parts of the double rack, substantially as set forth.

9. In a riding attachment for agricultural implements, the combination of a vertically-adjustable frame, a standard, a double rack applied to the standard, a shaft having crank portions to coöperate with the toothed parts of the rack, and having a circular portion intermediate of the crank portions working in the space formed between the parts of the rack to guide the frame in its vertical movements, and means for turning the shaft in its bearings, substantially as set forth.

10. In a riding attachment for agricultural implements, the combination of a movable frame, standards, actuating mechanism for effecting a movement of the frame, comprising oppositely-disposed cranks, and a sleeve for connecting the cranks for moving them together and shiftable to one or the other of the cranks when it is required to operate them separately, substantially as set forth.

11. In a riding attachment for agricultural implements, the combination of a movable frame, standards, actuating mechanism comprising oppositely-disposed cranks, a sleeve movable from one to the other of the cranks and to an intermediate point for connecting the two cranks, and a spring applied to the sleeve for holding it in the required position, substantially as set forth.

12. In combination, a frame, standards, shafts operatively connected with the frame to effect a movement thereof, oppositely-disposed cranks at the inner ends of the shafts provided with annular grooves, a sleeve movable from one to the other and to an intermediate point of the cranks for connecting them when required, and a spring applied to the inner side of the sleeve and having a projecting part to enter the space formed between the cranks or spring into either one of the annular grooves for holding the sleeve in the desired position, substantially as set forth.

13. In combination, a crank-axle comprising a plate, a hanger therefor having a corresponding plate, a ground-wheel mounted upon a spindle of the crank-axle and having a toothed rim, a pawl applied to and movable with the plate of the crank-axle for locking the latter with the toothed rim of the ground-wheel, and means applied to the hanger for effecting a release of the pawl, substantially as set forth.

14. In combination, a crank-axle, a hanger therefor, a ground-wheel mounted upon a spindle of the crank-axle and provided with a toothed rim, a pawl fulcrumed to the crank-axle, a spring for throwing the pawl into engagement with the aforesaid toothed rim, and oppositely-disposed trips adapted to be withdrawn from the path of the pawl and to be projected across its path to disengage it from the toothed rim in either of the extreme positions of the crank-axle, substantially as set forth.

15. In combination, a crank-axle, a hanger therefor, a pawl having pivotal connection with the crank-axle and adapted to interlock with the hanger and a spring to hold it therein for jointly holding with its accompanying pawl the crank-axle at the required position, a ground-wheel mounted upon a spindle of the crank-axle and having a toothed rim, and a second pawl pivoted to the crank-axle and adapted to interlock with the toothed rim, substantially as set forth.

16. In combination, a crank-axle, a hanger therefor, a ground-wheel mounted upon a spindle of the crank-axle, locking means between the crank-axle and its hanger, a second locking means for connecting the crank-axle with the ground-wheel and for holding the first-mentioned locking means in operative relation, and a trip for releasing the second locking means, whereby the first-mentioned locking means is liberated, substantially as and for the purpose set forth.

17. In a riding attachment of the character set forth, the combination with the framework, of vertically-disposed standards having laterally-extending spindles at their lower ends, ground-wheels mounted upon the spindles and adapted to operate after the manner of caster-wheels, and links interposed between the framework and parts connected with the standards, substantially as set forth.

18. In a riding attachment of the character specified, the combination with the framework, of vertically-disposed standards having outwardly-extending spindles at their lower ends, ground-wheels mounted upon the spindles, and guiding-arms adjustably mounted upon the standards and extending inward in an opposite direction to the spindles, substantially as and for the purpose set forth.

19. In a riding attachment, the combination with the framework, and laterally-adjustable standards bearing ground-wheels at their lower ends, of seat-bars loosely connected at their lower ends with parts applied to the lower extremities of the standards, and having their upper ends overlapping and adjustably connected together, substantially as specified.

In testimony that I claim the foregoing as my own I have hereto affixed my signature in the presence of two witnesses.

GEO. W. BABCOCK.

Witnesses:
HERBERT S. GOFFE,
J. HARRY GOFFE.